March 5, 1963 D. J. MARQUARDT 3,079,691
PROTRACTOR
Filed July 5, 1960 2 Sheets-Sheet 1
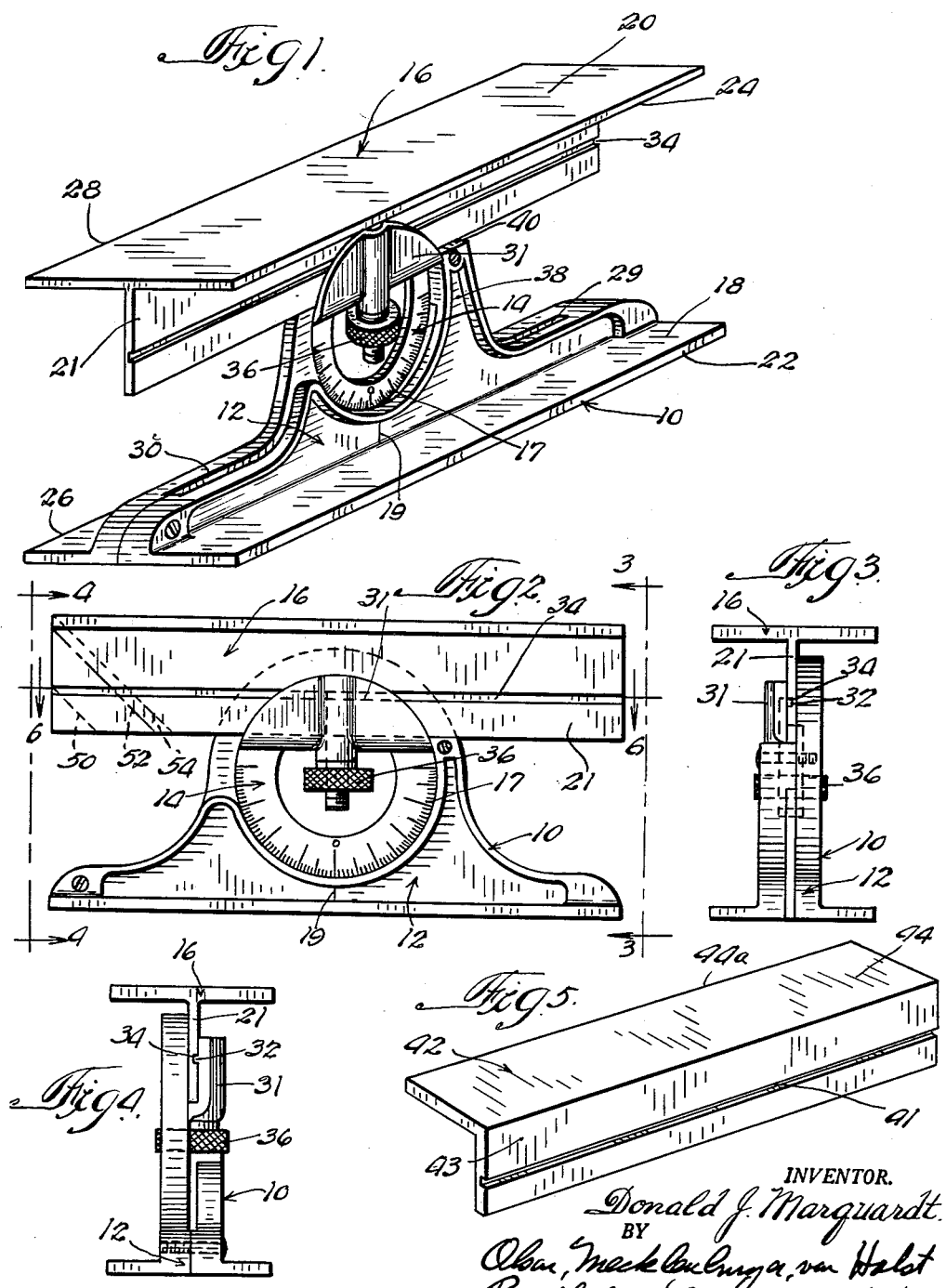
INVENTOR.
Donald J. Marquardt
BY March 5, 1963  D. J. MARQUARDT  3,079,691
PROTRACTOR
Filed July 5, 1960  2 Sheets-Sheet 2
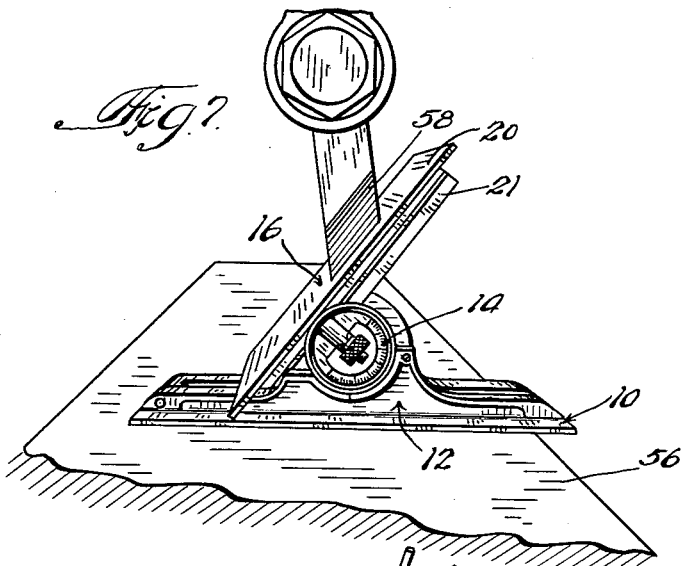
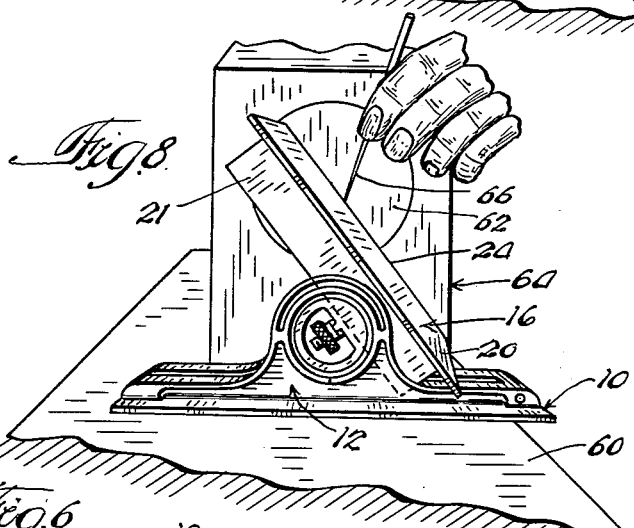
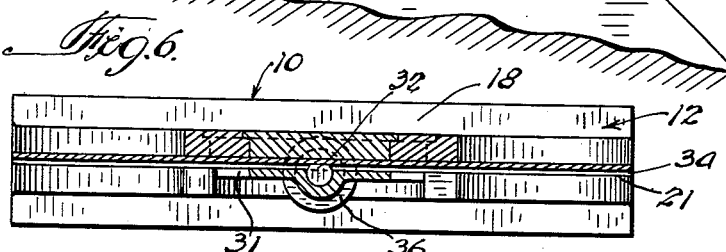
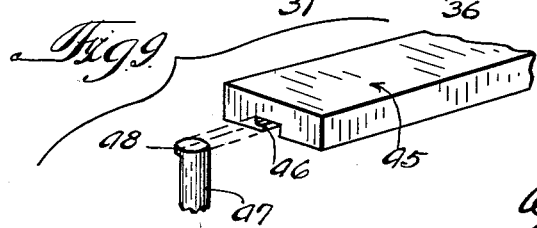
INVENTOR.
Donald J. Marquardt
BY
Olsen, Mecklenburger, von Holst
Pendleton & Neuman. Attys.

3,079,691
PROTRACTOR
Donald J. Marquardt, 11548 S. Yale Ave., Chicago 28, Ill.
Filed July 5, 1960, Ser. No. 40,745
6 Claims. (Cl. 33—75)

This invention relates to measuring instruments for machining and gauging operations and, more particularly, to a protractor which affords improved accurcy and is relatively inexpensive to produce and convenient to use.

Various protractors have heretofore been employed in machine shops for establishing angular settings of machine tools of various kinds, for checking the angular dimensions of unfinished and finished machine parts, and for numerous other applications; but these protractors were frequently inaccurate and inconvenient to use. Where greater accuracy was desired, such devices as sine bars and the like were used; however, these instruments generally comprised complex structures which were expensive to produce and cumbersome to use. Moreover, they did not permit as wide a range of adjustments as were afforded by protractors and were not adaptable to as great a variety of operations as the latter.

Accordingly, it is an object of this invention to provide an improved protractor which affords angular settings, measurements, and adjustments in a simple and accurate manner.

It is a further object of this invention to provide an improved protractor which can be utilized to obtain accurate tool layouts.

It is still a further object of this invention to provide an angle measuring instrument which has a wide range of adjustments and is capable of a greater variety of uses.

It is still another object of this invention to provide an improved protractor which is relatively inexpensive to produce and may be sold on the market at a price well within the buying range of the typical machinist, the latter being generally required to purchase his own tools.

Further and additional objects will become obvious from a consideration of the description, the accompanying drawings, and the appended claims set forth herein.

In one form of this invention a protractor is provided comprising a first member having a portion thereof for disposition on a supporting surface; an index unit which is mounted on the first member and rotates about a central axis spaced from and substantially parallel to a plane formed by the surface engaging portion of the first member; and a second member mounted on the index unit and rotatable therewith about the axis of rotation of the latter. The second member is provided with a relatively broad upper surface, which forms a second plane substantially parallel to the axis of rotation of the index unit. The peripheral portions of the aforesaid surface of the second member should be sufficiently spaced from the side of the protractor to allow the portions to be brought into contact with a perpendicular workpiece and to permit angular measurements to be made on such workpiece without interference by the first member or any screws, setscrews, or other devices which may protrude from the side of the protractor. It may also be desirable to have the corresponding outermost peripheral portions of the first and second members lie in the same planes normal to the axis of rotation of the index unit.

For a more complete understanding of this invention reference will now be made to the accompanying drawings wherein:

FIGURE 1 is a perspective view of one embodiment of this invention;

FIG. 2 is a side elevational view of the embodiment of FIG. 1;

FIG. 3 is a right end elevational view of FIG. 2;

FIG. 4 is a left end elevational view of FIG. 2;

FIG. 5 is a perspective view of a modified form of the workpiece-engaging member shown in FIG. 1;

FIG. 6 is a cross-sectional view taken along line 6—6 of FIG. 2;

FIG. 7 illustrates the embodiment of FIG. 1 being used to adjust the angle of a machine tool;

FIG. 8 illustrates the embodiment of FIG. 1 being used to scribe an angle on to a surface of the workpiece disposed perpendicular to the supporting surface; and FIG. 9 is a perspective view of another modified form of the workpiece-engaging member shown in FIG. 1.

Referring now to the drawings, and more particularly to FIG. 1, a protractor 10 is provided, which comprises generally a first member 12, an index unit 14 mounted thereon, and a second member 16 adjustably mounted on the index unit, which second member 16 has a relatively broad workpiece-engaging upper surface 20 and a centrally positioned flange 21 depending from portion 20. Member 12 is provided with a portion 18 for disposition on a supporting surface (e.g., a machine bed). This base-engaging portion 18 may constitute any desirable width provided it is sufficiently wide to allow the protractor to rest on the supporting surface in a stable manner without tipping. It is preferable, however, to limit the width of the portion 18 so that it wil not intersect the vertical planes which contain the peripheral portions 24 and 28 of the surface 20 of member 16.

The unit 14, mounted on member 12, rotates about an axis spaced from and substantially parallel to the plane of portion 18. It will generally comprise a circular configuration as shown in the embodiment of FIGS. 1 and 2, and may be inscribed with indicia 17 about its periphery. As may be seen best in FIG. 2, the indicia 17 cover the exposed half of the periphery of unit 14 and are in degrees. To facilitate reading of the angular settings from the indicia 17, an index mark 19 is imprinted on member 12. Since this mark remains stationary while the unit 14 is rotated, it will designate by reference to the aforesaid indicia the angle of disposition between the planes of surface 20 and portion 18.

Member 16 is affixed to unit 14 by clamp means 31, the latter being, in the embodiment of FIG. 1, a part of unit 14. A projection 32 provided in clamp means 31 fits into a groove 34 which is cut into the depending flange portion 21 of member 16. By this arrangement member 16 can be slid lengthwise and is maintained in a plane parallel to the axis of rotation of unit 14. Setscrew 36 is provided for holding member 16 in lengthwise adjusted positions on unit 14.

The relatively broad surface 20 of member 16, in this instance, is of rectangular configuration and is spaced from and substantially parallel to the rotary axis of unit 14. It should extend sufficiently far from the vertical plane formed by flange 21 so that when the protractor stands upon a supporting base, member 12 or anything protruding from the side of the protractor will not preclude the peripheral portions 24 and 28 of surface 20 from contacting a work surface perpendicular to such base, such as shown in FIG. 8. Surface 20 must also be wide enough to support various machine tools when they are subjected to angular adjustments and measurements. In the embodiment of FIG. 1, surface 20 is shown as equal in width to the surface-engaging portion 18 of member 12 and aligned thereto whereby the corresponding peripheral portions 22 and 24 and 26 and 28, respectively, define planes normal to the axis of rotation of the unit 14. This latter construction, among other things, allows the protractor to be used on its side to lay out angles and prevents a machinist from losing his angle setting when he is not using the protractor and lays it upon its side.

Supporting member 12 is provided with slots 29 and 30 which receive the depending flange portion 21 of member 16 and allow the latter member to be rotated to a position at which it defines with member 12 an angle slightly larger than 90 degrees. Since member 12 is not limited to the length shown in the drawings, the necessity of the aforesaid slots may be eliminated by substantially shortening member 12 and precluding it from interfering with member 16 when the latter is rotated about the axis of rotation of index unit 14. Of course, member 12 cannot be so shortened that it will fail to support the protractor in an upright position.

Instead of providing a groove in flange portion 21 of member 16 and a projection in clamp means 31, as illustrated in the drawings, a groove may be cut into the clamp means and a projection of substantially the same length and width as groove 34 may protrude from flange 21. This alternative arrangement would operate in substantially the same way as does the illustrated embodiment, utilizing a setscrew similar to the latter.

Supporting member 12 is provided with an elongate vertical portion 38, the upper surface 40 of which contacts the lower edge of flange portion 21 of member 16 and terminates the rotational movement of member 16 in one direction at a position where the plane of the relatively broad surface 20 of member 16 is parallel to the plane of the surface engaging portion 18 of supporting member 12. In this position, surface 20 will define an angle of zero degrees with respect to the supporting base upon which the protractor is disposed. Thus, such an arrangement permits the protractor to be quickly and accurately adjusted to zero degrees without resort to the indicia imprinted on unit 14. It will be understood that, where desired, the elongate vertical portion 38 may be either shortened or lengthened so that surface 20, when brought in contact with surface 40 of portion 38, will define an angle other than zero degrees with respect to the supporting surface.

Referring to FIG. 5, a modification 42 is shown which may be used on protractor 10 in place of member 16. This modification has, rather than the T-shaped cross section of member 16, an L-shaped cross section. Like member 16 it is provided with a groove 41 in its depending flange portion 43 and is capable of use with clamp means 31. If desired, the peripheral portion 44a of the relatively broad upper surface 44 may be positioned in alignment with a corresponding outermost peripheral portion of supporting member 12, whereupon the aforesaid portions will lie in the same vertical plane normal to the rotary axis of the index unit 14.

A further modification of this invention is shown in FIG. 9. In lieu of the T-shaped member 16, best shown in FIGS. 1, 3 and 4, and the L-shaped member 42, shown in FIG. 5, a block-shaped member 45 may be employed. The latter is provided with a groove 46 in its underside, and a setscrew 47 has a projection 48 thereon which fits into this groove. The arrangement will function in substantially the same manner as the T-shaped and L-shaped members.

In certain operations it may be desirable to bring the relatively broad surface 20 of member 16 close to or contiguous with the supporting base. To attain this result a vertical edge of the flanged portion 21 of member 16 may be beveled, as shown by the dotted lines in FIG. 2. Where it is not necessary to bring surface 20 in contiguity with or even closely adjacent to the supporting base, the vertical edge may be beveled along a line 50 at any suitable angle. Where the application makes it desirable to bring surface 20 nearly contiguous with the supporting base, the edge may be beveled along the line 52 which terminates closely adjacent to surface 20. Finally, in those operations where it is deemed important to bring surface 20 substantially contiguous with the supporting base, portion 21 of member 16 should be beveled along line 54 which terminates substantially adjacent to surface 20.

FIGS. 7 and 8 diagrammatically illustrate two methods of utilizing the embodiment 10 of the present invention. In FIG. 7, protractor 10 is set upon a machine bed 56 or other supporting surface, and a cutting tool bit 58 or the like is aligned with the relatively broad surface 20 of the protractor. The surface 20 provides a broad base for the tool bit and thus improves the accuracy of the angle measurements. Once having been aligned with the protractor, the tool bit 58 may be then adjusted either horizontally or vertically to any desired position without altering the angle which it defines with respect to a workpiece.

In FIG. 8, protractor 10 is placed upon machine bed 60 or other supporting surface, and the peripheral portion 24 of member 16 contacts the perpendicular surface 62 of a workpiece 64. The desired angle is then conveniently and accurately scribed onto the perpendicular surface 62 with scriber 66, the path of the scriber being guided by peripheral portion 24.

It thus will be seen that an improved protractor has been provided which is especially adapted for making angle adjustments, settings and measurements in connection with machine tools and similar devices and for making accurate tool layouts. Moreover, an improved protractor has been provided which is relatively inexpensive to produce and may be sold at prices within the purchasing power of the ordinary machinist.

While several embodiments of this invention are shown above, it will be understood, of course, that the invention is not to be limited thereto, since many modifications may be made which fall within the true spirit and scope of this invention. It is contemplated, therefore, that any such modifications shall be covered by the appended claims.

What is claimed is:

1. A protractor for use in connection with workpieces comprising a first member having a portion thereof for disposition on a surface; a unit mounted on said first emmber for rotation about an axis spaced from and substantially parallel to a plane formed by the surface-engaging portion of said first member; and a second member mounted on said unit and rotatable therewith about the axis of rotation of the latter, said second member having a surface forming a second plane spaced from and substantially parallel to the axis of rotation of said unit, said surface of said second member having at least one marginal edge disposed in a plane normal to the axis of rotation of said unit, the last-mentioned plane being disposed at least as far outwardly from said protractor as the remainder of said protractor whereby said marginal edge may engage a workpiece without interference from the remainder of said protractor.

2. The protractor of claim 1 wherein means are provided for terminating at a predetermined station the rotational movement of said second member in one direction whereby when said second member is at said station said plane formed by said second member surface defines a predetermined angle with respect to said plane formed by said surface-engaging portion of said first member.

3. The protractor of claim 1 wherein means are provided for terminating at a predetermined station the rotational movement of said second member in one direction whereby when said second member is at said station said plane formed by said second member surface defines an angle of zero degrees with respect to said plane formed by said surface-engaging portion of said first member.

4. The protractor of claim 1 wherein means are provided on said unit for effecting axial movement of said second member in a plane parallel to the axis of rotation of said unit.

5. A protractor for use in connection with workpieces comprising a first member having a portion thereof for disposition on a surface; a unit mounted on said first member for rotation about an axis spaced from and substantially parallel to a plane formed by the surface-engaging portion of said first member; and a second member mounted on said unit and rotatable therewith about the axis of rotation of the latter, said second member having a surface forming a second plane spaced from and substantially parallel to the axis of rotation of said unit, said first member having at least one marginal edge aligned with a corresponding marginal edge of said surface of said second member, whereby the edges lie in a plane normal to the axis of rotation of said unit, which plane is disposed at least as far outwardly from said protractor as the remainder of said protractor so that the marginal edges may engage a workpiece without interference from the remainder of said protractor.

6. A protractor for use in connection with workpieces comprising a first member having a first portion for disposition on a supporting surface and a second portion projecting angularly and upwardly from said first portion; an index unit mounted on said first member second portion for rotation about an axis spaced from and substantially parallel to a plane formed by the surface-engaging part of said first portion; and a second member mounted on said index unit and rotatable therewith about the axis of rotation of the latter, said second member including an upper portion having a surface forming a second plane spaced from and substantially parallel to the axis of rotation of said index unit, said surface of said second member upper portion having at least one marginal edge disposed in a plane normal to the axis of rotation of said second member, the last-mentioned plane being disposed at least as far outwardly from said protractor as the remainder of said protractor, whereby said marginal edge may be brought into engagement with a workpiece without interference from the remainder of said protractor, said second member also including a flange portion depending from said second member upper portion, which flange portion engages said index unit, said flange having at least one transverse edge thereof beveled so that a transverse marginal edge of said surface of said second member upper portion is disposed in close proximity to the surface-engaging part of said first member first portion when said sceond member is in one position of rotational adjustment.

References Cited in the file of this patent
UNITED STATES PATENTS

| | | |
|---|---|---|
| 2,000,296 | Cox | May 14, 1935 |
| 2,421,395 | Schneider | June 3, 1947 |